United States Patent
Stiles et al.

(10) Patent No.: US 8,456,082 B2
(45) Date of Patent: Jun. 4, 2013

(54) SURFACE-EMISSION LIGHT SOURCE WITH UNIFORM ILLUMINATION

(75) Inventors: James Alexander Robert Stiles, Toronto (CA); Hiroki Hamada, Hirakata (JP); Isao Yoshida, Tsukuba (JP)

(73) Assignees: IFire IP Corporation, Edmonton, Alberta; Sanyo Electric Co., Ltd., Osaka (JP)

( * ) Notice: Subject to any disclaimer, the term of this patent is extended or adjusted under 35 U.S.C. 154(b) by 42 days.

(21) Appl. No.: 12/325,883

(22) Filed: Dec. 1, 2008

(65) Prior Publication Data

US 2010/0133989 A1 Jun. 3, 2010

(51) Int. Cl.
*H01J 1/62* (2006.01)

(52) U.S. Cl.
USPC .......................................................... 313/506

(58) Field of Classification Search
USPC ................................. 313/500–508
See application file for complete search history.

(56) References Cited

U.S. PATENT DOCUMENTS

| | | | |
|---|---|---|---|
| 5,432,015 A | 7/1995 | Wu et al. | |
| 5,965,988 A | 10/1999 | Vollkommer et al. | |
| 5,998,925 A | 12/1999 | Shimizu et al. | |
| 6,596,195 B2 | 7/2003 | Srivastava et al. | |
| 6,695,982 B2 | 2/2004 | Ellens et al. | |
| 6,771,019 B1* | 8/2004 | Wu et al. ........................ | 313/503 |
| 6,809,471 B2 | 10/2004 | Setlur et al. | |
| 6,919,126 B2 | 7/2005 | Wu et al. | |
| 7,049,757 B2 | 5/2006 | Foust et al. | |
| 7,112,373 B2 | 9/2006 | Stiles et al. | |
| 7,391,060 B2 | 6/2008 | Oshio | |
| 7,417,368 B2 | 8/2008 | Wu et al. | |
| 2002/0060325 A1* | 5/2002 | Yano et al. ..................... | 257/103 |
| 2004/0135123 A1 | 7/2004 | Judenhofer et al. | |
| 2004/0135495 A1 | 7/2004 | Wu et al. | |
| 2004/0170864 A1* | 9/2004 | Liu ............................... | 428/690 |
| 2005/0093008 A1 | 5/2005 | Suehiro et al. | |
| 2006/0043391 A1 | 3/2006 | Erchak et al. | |
| 2006/0054076 A1 | 3/2006 | Dwilinski et al. | |
| 2006/0203468 A1* | 9/2006 | Beeson et al. .................. | 362/84 |
| 2007/0018573 A1* | 1/2007 | Shioi ............................. | 313/512 |
| 2007/0053208 A1 | 3/2007 | Justel et al. | |
| 2007/0090755 A1 | 4/2007 | Eida et al. | |
| 2007/0103069 A1* | 5/2007 | Manuela et al. .............. | 313/512 |
| 2007/0221866 A1 | 9/2007 | Sohn et al. | |
| 2007/0228931 A1 | 10/2007 | Kim et al. | |
| 2008/0080165 A1 | 4/2008 | Kim et al. | |
| 2008/0084150 A1 | 4/2008 | Cok | |
| 2008/0203911 A1 | 8/2008 | Beckers | |

FOREIGN PATENT DOCUMENTS

| | | |
|---|---|---|
| CA | 2352530 Y | 5/2002 |
| CA | 2496290 A | 10/2003 |
| WO | 00/12649 A | 3/2000 |

* cited by examiner

*Primary Examiner* — Anh Mai
*Assistant Examiner* — Brenitra M Lee
(74) *Attorney, Agent, or Firm* — Sim & McBurney

(57) ABSTRACT

An extended area uniform light source providing uniform luminance is taught for displays and other applications where the light emission can be planar or have curvature. The uniform light source is achieved using a combination of a blue light-emitting electroluminescent layer and a highly stable inorganic photoluminescent color conversion layer to tailor the color spectrum of the emitted light. The invention thus encompasses the uniform light source, displays incorporating the uniform light sources as well of methods of making such light sources and displays.

28 Claims, 3 Drawing Sheets at L60

SURFACE-EMISSION LIGHT SOURCE WITH UNIFORM ILLUMINATION

FIELD OF THE INVENTION

The present invention relates to an extended area uniform light source providing uniform luminance for devices and other applications where the light emission can be planar or have curvature. The uniform light source is achieved using a combination of a blue light-emitting electroluminescent layer and a highly stable inorganic photoluminescent colour conversion layer to tailor the colour spectrum of the emitted light. The invention thus encompasses the uniform light source, devices and displays incorporating the uniform light sources as well of methods of making such light sources and displays.

BACKGROUND OF THE INVENTION

Thick film dielectric electroluminescent (TDEL) devices for displays and other applications are described, for example, in U.S. Pat. Nos. 5,432,015 and 6,919,126 (the disclosures of which are incorporated herein in their entirety). In comparison to conventional thin film electroluminescent (TFEL) devices, TDEL devices provide superior resistance to dielectric breakdown, reduced operating voltage and substantially increased luminance.

In general TDEL devices have a thick film dielectric composite structure deposited on a glass, glass ceramic or ceramic substrate that withstands processing temperatures sufficiently high to facilitate deposition and annealing of phosphor films that can provide high luminosity. The thick film dielectric layers used in these displays have a high dielectric constant, allowing the use of relatively thick dielectric layers in the displays without a significant increase in the display operating voltage. The relatively thick dielectric layer, typically greater than 10 µm, is used to prevent dielectric breakdown during display operation. Typically, the thick film dielectric composite structure comprises a layer of a sintered perovskite piezoelectric or ferroelectric material such as lead magnesium niobate (PMN) or lead magnesium titanate-zirconate (PMN-PT) with a dielectric constant of several thousand. To form the composite there is typically applied a thinner overlayer of a compatible piezoelectric or ferroelectric material such as lead zirconate titanate (PZT) using metal organic deposition (MOD) or sol gel techniques to smooth the thick film surface for deposition of a thin film phosphor structure.

U.S. Pat. No. 7,112,373 describes a TDEL device having a europium activated barium thioaluminate phosphor film that emits blue light with high luminosity. U.S. Patent Application Serial No. 2004/0135495 describes a full colour display having a thick film dielectric composite structure and an europium activated barium thioaluminate phosphor film to generate blue light and having blue, green and red sub-pixels wherein the green and red sub-pixels have overlying photoluminescent films that convert the blue light to green and red light respectively. In this structure the blue light is completely absorbed in the green and red photoluminescent films to provide green and red light to meet the CIE colour coordinate requirements for full colour video displays. The green and red photoluminescent films for this display consist of pigment particles formulated using organic dyes dispersed in an optically transparent polymer film. However, the photoluminescence efficiencies of these films degrade differentially with operating time due to exposure to the blue light used for excitation and to ultraviolet light from the ambient environment. This differential degradation causes colour shifts with increasing operating time.

White light sources consisting of blue light-emitting diodes (LEDs) with a coating comprising inorganic photoluminescent materials to convert some of the blue light to longer wavelength light are known. Yttrium aluminum garnet (YAG) has been used as the photoluminescent colour conversion layer in combination with these LEDs to generate white light. U.S. Pat. No. 5,998,925 discloses the use of a cerium doped YAG phosphor in combination with a blue light emitting LED to provide a white light source. The YAG-based materials used with these devices provide for a stable light output, however, the light sources are essentially point sources due to the small size of the primary blue light-generating LEDs making them unsuitable for applications requiring an extended light source with uniform luminosity. U.S. Pat. No. 7,362,048 teaches how the YAG materials can be doped with additional elements such as gadolinium to shift the colour temperature of the white light to a desired value. U.S. Pat. No. 7,417,368 discloses a TDEL pixel array having a europium activated barium thioaluminate phosphor film that generates blue light that is absorbed by a cerium doped YAG as a photoluminescent overlayer to generate yellow light. U.S. Pat. No. 7,391,060 discloses a TDEL device having a barium thioaluminate blue-emitting phosphor layer and a photoluminescent layer that converts blue light to red or green light.

It is therefore desirable to provide an extended area uniform light source providing uniform luminance for displays and other applications as well as displays and applications incorporating the light source and methods of making therefor. The uniform light source is achieved using a combination of a blue light-emitting electroluminescent layer and a highly stable inorganic photoluminescent colour conversion layer to tailor the colour spectrum of the emitted light and provide a uniform white illumination.

SUMMARY OF THE INVENTION

The present invention provides an extended light source having a uniform emission intensity wherein the emission colour can be tuned to the requirements of a particular application. The invention encompasses devices and other applications such as but not limited to displays incorporating such a light source as well as methods of making the light source and using the light source.

In an embodiment of the present invention, the light-source is a device comprising a thick film dielectric composite layer, an europium activated barium thioaluminate phosphor film, and a cerium doped YAG (yttrium aluminum garnet) semi-transparent photoluminescent layer in combination with the phosphor film. The phosphor film provides a uniform high intensity blue light source that efficiently excites the cerium doped YAG to provide an efficient means to convert only a portion of the blue light that combines with the yellow light to provide a uniformly luminous white light source with a tunable colour temperature. The efficiency of such light sources can be further enhanced by maximizing the extraction of light generated from the blue light-emitting electroluminescent phosphor layer and from the cerium doped YAG photoluminescent layer.

In accordance with an aspect of the present invention there is provided a light emitting device having a spatially extended surface over which the luminosity of the emitted light at the emission surface is uniform, said device comprising a primary blue light-emitting electroluminescent layer overlaid with a photoluminescent film, wherein said photoluminescent film permits transmission of only a portion of the blue light to convert to light of a longer wavelength to provide light having a defined colour.

The photoluminescent film is not in direct contact with the blue light emitting phosphor layer, but rather is disposed over the light emission side of the blue light-emitting electroluminescent device comprising a phosphor layer disposed between two electrode layers.

According to another aspect of the present invention there is provided a light emitting device having a spatially extended surface over which the luminosity of the emitted light at the emission surface is uniform, said device comprising a primary blue light-emitting phosphor layer overlaid with a semi-transparent photoluminescent film, wherein said photoluminescent film permits transmission of only a portion of the blue light to convert to light of a longer wavelength to provide a white light having a defined colour temperature.

In accordance with another aspect of the present invention is a light emitting device having a spatially extended surface over which the luminosity of the emitted light at the emission surface is uniform, said device comprising a thick film composite dielectric layer, a blue light-emitting phosphor layer, a photoluminescent film coated over the blue light-emitting phosphor layer, wherein said photoluminescent film permits transmission of only a portion of the blue light to convert to a light of a longer wavelength to provide a white light having a defined colour temperature.

In aspects of the invention the spatially extended surface is a planar surface.

In other aspects of the invention the spatially extended surface is a curved surface.

In still other aspects of the invention the spatially extended surface is a concave surface for concentrating the intensity of the emitted light in a region above the surface.

In aspects of the invention blue light is provided by a thin solid state inorganic phosphor film aligned parallel to the blue light-generating surface. The phosphor film may be a component of an ac electroluminescent lamp. The electroluminescent lamp may comprise a thick film dielectric composite layer disposed between the electrodes of the lamp.

In aspects of the invention there is provided an ac electroluminescent lamp comprising a photoluminescent layer disposed over the blue light-emitting phosphor layer, wherein said photoluminescent layer permits transmission of only a portion of the blue light to convert to a light of a longer wavelength to provide a white light having a defined colour temperature. The lamp may further comprise a thick film dielectric composite layer onto which the phosphor film is provided.

In aspects of the invention the photoluminescent layer comprises a garnet structure material. The garnet structure material may be a yttrium aluminum garnet (YAG) composition doped substitutionally to provide a desired emission spectrum and to minimize re-absorption of emitted light originating within the layer. The photoluminescent layer is semi-transparent to blue light. The composition is provided within a resin material where the amount of YAG is about 20% to about 40% by weight of the total photoluminescent layer.

In further aspects of the invention the photoluminescent layer comprises a cerium or europium doped material selected from the group consisting of alkaline earth aluminates, rare earth aluminates, alkaline earth silicates, alkaline earth aluminosilicates, alkaline earth phosphates, alkaline earth silicon nitrides, silicon oxynitrides and combinations thereof. In this aspect, the photoluminescent particles in the resin can be nanosized as herein described.

In aspects of the invention the blue light emitting phosphor film is a barium thioaluminate phosphor film. In further aspects of the invention the photoluminescent layer is semi-transparent to blue light and comprises cerium doped YAG (yttrium aluminum garnet).

In aspects of the invention the emitted light is used in applications selected from backlights for electronic information displays, sensors and chemical assay devices.

In further aspects of the invention the emitted light is used in applications requiring a light source and general indoor or night-time outdoor lighting.

According to a further aspect of the invention there is a method of making a uniform white light source, said method comprising;
  to a thick film composite dielectric layer applying a blue light-emitting phosphor layer;
  coating said blue light-emitting phosphor layer with a semi-transparent photoluminescent film; and
  applying an electric field such that said photoluminescent film permits transmission of only a portion of the blue light to convert to a light of a longer wavelength to provide a light having a defined colour.

Other features and advantages of the present invention will become apparent from the following detailed description. It should be understood, however, that the detailed description and the specific examples while indicating embodiments of the invention are given by way of illustration only, since various changes and modifications within the spirit and scope of the invention will become apparent to those skilled in the art from said detailed description.

BRIEF DESCRIPTION OF THE DRAWINGS

The present invention will become more fully understood from the description given herein, and from the accompanying drawings, which are given by way of illustration only and do not limit the intended scope of the invention.

DETAILED DESCRIPTION OF THE INVENTION

Figure 1:
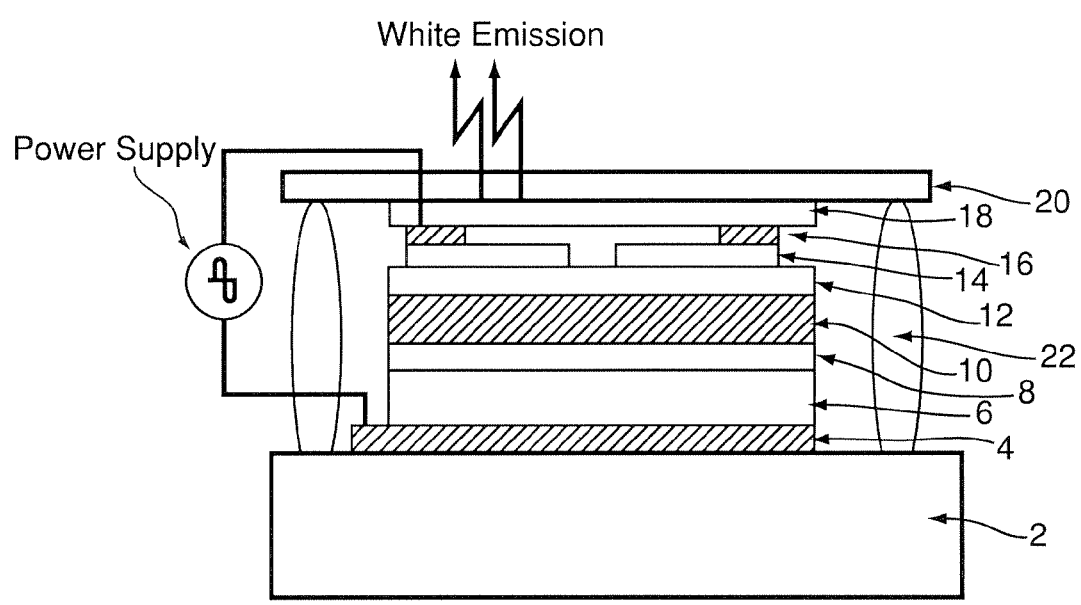
FIG. 1 is a cross sectional view of a white light emission device fabricated according to an embodiment of the invention.

The present invention is a uniform light source that is emitted from an extended area. The uniform light source is for use in applications requiring a light source with uniform emission intensity over an extended area of emission surface. The invention encompasses devices for various applications incorporating such a light source as well as methods for making the light source and the light source per se.

The invention is a combination of a thick film dielectric composite layer together with a blue light emitting electroluminescent film and an inorganic photoluminescent layer whereby the photoluminescent layer is semitransparent to blue light generated by the electroluminescent layer. In this manner, of some of the blue light is converted to yellow light and as a result white light is generated and emitted. The semi-transparency of the photoluminescent layer is due in part to the choice of an appropriate loading of the selected photoluminescent particles in the matrix of the photoluminescent layer. A single pair of electrodes may be used to drive the device. The invention is particularly useful in applications where the light source may be required to operate at temperatures above 100° C. Examples of applications for the light source of the invention include backlights for electronic information displays, sensors and chemical assay devices requiring a light source and general indoor or night-time outdoor lighting.

In one non-limiting embodiment, the present invention is a blue light-emitting ac TDEL device/lamp incorporating a semi-transparent colour conversion layer of photoluminescent cerium doped yttrium aluminum garnet ($Y_3Al_5O_{12}$:Ce) particles dispersed in a resin matrix. The TDEL devices may be constructed according to the disclosure of U.S. Pat. Nos. 5,432,015; 6,589,674; 6,919,126 and 7,112,373; and U.S. patent application Ser. Nos. 11/122,301; 10/736,020; 10/736,368; 11/072,824; 11/100,190; 11/184,457; and 11/196,163 (the disclosures of which are hereby incorporated herein by reference in their entirety.).

In the present invention a blue light emitting electroluminescent phosphor film is provided in conjunction with an inorganic photoluminescent layer that is semitransparent to blue light, that is, the photoluminescent layer only partially absorbs the blue light such that a desired uniform white illumination is provided and this can be provided over an extended area. Devices of the invention comprise a thick film dielectric composite layer (the thick film dielectric composite structure comprising a layer of a sintered perovskite piezoelectric or ferroelectric material such as lead magnesium niobate (PMN) or lead magnesium titanate-zirconate (PMN-PT) with a dielectric constant of several thousand and a thinner smoothing overlayer of a compatible piezoelectric or ferroelectric material such as lead zirconate titanate (PZT)); a blue-light emitting layer; and a semi-transparent photoluminescent layer. The thick dielectric structure comprises a lead magnesium niobate or lead magnesium niobate titanate (PNM or PNM-PT) sintered thick film layer with a smoothing layer of lead zirconate titanate (PZT) as taught in U.S. Pat. No. 5,432,015, and International Patent Applications WO00/70917 and WO03/056879 (the disclosures of which are hereby incorporated by reference).

In this manner a uniform white light source is generated over an extended area. The extended area can be as large as the area of an available substrate upon which an electroluminescent light emitting device can be fabricated and the size of the equipment used to form the layers of the device.

Thus there is really no limit to the area of the semi-transparent photoluminescent layer that can be formed over the blue light emitting electroluminescent device (the device comprising a thick film dielectric composite layer), other than that imposed by the size of the film processing equipment. Areas of a square meter or more are feasible. If the area is very large, it may be necessary to form stripes of metallic conductor spaced at intervals over the surface of the transparent electrode of the electroluminescent device to reduce the electrical resistivity of the transparent electrode. These stripes can be connected in parallel at the edge of the light source device so it can be operated using a single electrical source if desired. For devices with an area greater than a few square centimeters it may be advantageous to divide the TDEL light source into a number of sub-areas each driven using separate electrical sources to minimize the consequences of an electrical short circuit in the device or to provide a controlled spatial variation in the light intensity.

In further aspects of the invention, the white light generating devices of the invention can be made using a curved rigid substrate or a flexible substrate capable of withstanding the fabrication process conditions for TDEL devices so that the completed devices can be bent to the desired curvature. The radius of curvature for a curved device can vary from infinity (i.e. a flat surface) down to a centimeter or less, depending on the geometry of the available film deposition equipment. A curved light source can be useful to increase the light intensity at distances from the light source comparable to or greater than the spatial extent of the light source. One of skill in the art would understand that suitable materials for use as a linear or curved substrate include but is not limited to refractory sheet materials include but are not limited to ceramics such as alumina, metal ceramic composites, glass ceramic materials and high temperature glass materials.

With reference to FIG. 1 (not to scale), a TDEL device is constructed on a 5 centimeter by 5 centimeter glass substrate 2 to which a thin barrier layer of aluminum oxide (not shown) is applied to minimize chemical interactions between the glass substrate and subsequently deposited layers of the device structure. A lower electrode 4 and a thick film dielectric layer 6 to which a further high dielectric constant smoothing layer 8 (thus forming a composite thick film dielectric layer or structure) are disposed over the substrate. A set of further layers (not shown) comprising in sequence a barium titanate film, a barium tantalate film and an aluminum oxide film are deposited over the smoothing layer 8 for the purpose of chemically isolating the thick film dielectric composite structure from a blue light-emitting europium activated barium thioaluminate phosphor film 10 that is disposed over these layers. An upper thin film dielectric film 12 comprising aluminum nitride is disposed over the phosphor layer 10 and an indium tin oxide film 14 with bus bars 16 are disposed over the upper dielectric layer 12 to form a second electrode for operating the TDEL device. A photoluminescent colour conversion layer 18 comprising cerium doped YAG dispersed in a resin matrix is disposed over the upper electrode 16 with bus bars 16 and a cover glass 20 with a perimeter sealing bead 22 to protect the device from the ambient atmosphere is provided.

In an embodiment of the invention the semi-transparent photoluminescent composite colour conversion layer comprises an inorganic garnet structure of inorganic photoluminescent particles embedded in a polymer matrix. More specifically the colour conversion layer may comprise about 20% to about 40% by weight of the total layer. The invention encompasses cerium doped YAG particles having a particle size distribution in the range of about 3 to about 7 micrometers dispersed in a resin comprising epoxy, silicone or like material. The thickness of the photoluminescent colour conversion film may be in the range of about 0.5 to about 1 millimeters. The loading and thickness of the colour conversion particles creates the semi-transparency for the photoluminescent film such that only a portion of the phosphor light is absorbed by this layer and thus white light is emitted.

A variety of materials may be used to form the photoluminescent colour conversion layer of the present invention. Garnet structure materials are used in one aspect due to their high stability in the presence of blue or ultraviolet light from the excitation light source or from the ambient environment. It is also desirable that the quantum efficiency for absorption of blue light and re-emission of usable longer wavelength light be as high as possible. Cerium doped YAG ($Y_3Al_5O_{12}$:Ce) has an optical absorption efficiency of about 0.68. The absorption efficiency is defined as the fraction of incident blue photons on an emission center that are absorbed. Ce doped YAG has an internal emission efficiency of 0.88. The internal emission efficiency is defined as the fraction energy absorbed by an emission center that is re-emitted as a longer wavelength visible photon. The external emission efficiency for Ce doped YAG is 0.60 and is defined as the fraction of long wavelength photons emitted external to the YAG material that are emitted by the emission centers. The total emission efficiency is the product of the internal and external emission efficiencies. The excitation spectrum for cerium doped YAG has a peak at 460 nanometers, close to the 475 nanometer emission peak for the europium activated barium thioaluminate electroluminescent phosphor. Other photoluminescent phosphors may be suitable for other applications where long term stability is less important and where specially tailored emission spectra are desirable. Table 1 gives a list of some such materials with their principal excitation wavelengths and their emission colour. Other suitable materials for use in the photoluminescent layer may be selected from rare earth tungstates, rare earth molybdates, calcium thiophosphates, calcium zinc silicates, alkali earth silicates, alkaline earth silicates, nitrogen substituted alumino-silicates, rare earth oxynitrides, alkaline earth chlorosilicates and combinations thereof.

Nano-scale photoluminescent powders may also be used in the invention. In some cases the internal emission efficiency can be increased in nanometer sized powder due to a lowering of the emission site symmetry to increase the probability of radiative emission rather than non-radiative release of energy gained by absorption of a short wavelength blue photon. In this instance non-radiative release of energy includes radiative emission at wavelengths longer than those for visible light as well as energy dissipation by means of lattice vibration (phonon) excitation. Such effects become important when the photoluminescent material particle size becomes smaller than about 10 nm. When nano-scale particles in this size range are utilized, the uniform dispersion of the particles within the matrix of the photoluminescent film becomes difficult, and clustering of the particles may need to be inhibited using appropriate non-ionic or ionic surface coatings on the particles or surfactants in the matrix material precursor materials Devices of the invention incorporate a blue light emitting film which is an europium activated barium thioaluminate phosphor film, in aspects a $BaAl_2S_4$ II phosphor film activated with europium as taught in US patent application 2006/0027788 (the disclosure of which is incorporated herein in its entirety). Such a phosphor film provides a uniform high intensity blue light source that efficiently excites cerium doped YAG to provide an efficient means to convert a portion of the blue light to yellow light to provide a uniformly luminous white light source with a tunable colour temperature. The colour temperature refers to the spectral distribution of the white light, and relates to the emission spectrum of a black body held at a given temperature For example a high colour temperature means that the white light has a bluish tinge and a low colour temperature means that the white light has a yellowish tinge. This is well understood by one skilled in the art. The colour temperature of the device of the present invention can be adjusted by varying the parameters associated with the colour conversion layer to change the transmission of blue light and the intensity of longer wavelength light that is generated, for example by varying the thickness of the colour conversion layer, the loading of YAG particles or the size distribution of the YAG particles. The efficiency of such devices can be further enhanced by maximizing the extraction of light generated from the blue light-emitting electroluminescent phosphor layer and from the cerium doped YAG photoluminescent layer. Additionally TDEL devices are suitable for use at temperatures at least up to about 110° C., making them suitable for use in a wide range of applications.

The TDEL blue light emitter used in the invention can be constructed with a large emission area that can be driven using a single pair of electrodes for cost effective application. From this perspective, it is advantageous to use an ac TDEL blue-emitter rather than an ac TFEL blue emitter, as the latter can not be fabricated to have large area emitting area that can be driven by a single electrode pair. This is because TFEL emitter devices operate at voltages very near the dielectric breakdown voltage for the thin film dielectric layers used in these devices. Since dielectric breakdown is triggered by pinhole or similar defects in the dielectric layers and since the probability of such a defect scales with the area of the emitter, the probability of device failure due to dielectric breakdown scales with the area of the emission surface. From a practical standpoint TFEL emitters driven by a single electrode pair are limited in dimension to approximately 0.01 $cm^2$. By contrast TDEL devices can have large area of at least several square centimeters driven with a single electrode pair since their much thicker dielectric layers are much less susceptible to dielectric breakdown. The high dielectric constant of the thick dielectric layer in TDEL devices enables them to be operated at reasonably low voltages despite the thickness of their dielectric layer. The phosphor thickness of TDEL devices can be varied to provide an optimum combination of operating voltage and luminous efficiency. Electroluminescent devices driven using dc current at low voltage such as organic light emitting diodes (OLEDs) are also known, but achieving a uniform current density to provide uniform emission intensity over large areas is very difficult. Further OLEDs are restricted to use at ambient temperatures below about 60° C. due to the inherent thermal instability of the organic phosphor materials used for this type of device. Other types of light-emitting devices such as light-emitting diodes (LEDs) are also known, but they do not provide uniform illumination due to the inherent small size of LEDs.

The intensity of yellow light generated within the photoluminescent layer is increased when the coupling of blue light from the blue light-emitting electroluminescent phosphor into the photoluminescent layer is increased. This coupling is optimized when the index of refraction of the photoluminescent layer is equal to or greater than that of the electroluminescent phosphor layer and reflections at the surfaces of any intervening layers is minimized for example by ensuring the thickness of any intervening layers is small compared to the wavelength of the blue light in those layers. In the case where the index of refraction of the photoluminescent layer is less than that of the electroluminescent layer the optical coupling is increased if the difference between the two indices of refraction is decreased.

Embodiments of the present invention can provide relatively close matching between the optical index of refraction of a blue light-emitting europium activated barium thioaluminate and the optical index of refraction of cerium doped YAG. The europium activated barium thioaluminate phosphor films used to demonstrate the utility of the present invention was found by the inventors to have a mean optical index of refraction of 2.03 by ellipsometry measurements whereas the index of refraction for single crystal YAG is known in the art to be about 1.82 in the infrared at 1062 nm and increasing through the optical range to 2.145 in the near ultraviolet at 193 nm. If the YAG is cerium doped, its optical index will be altered. Cerium doping causes the photoluminescence emission peak of the YAG to be shifted with respect to it maximum absorbance wavelength so that re-absorption of photoluminescent light in the film is minimized. If the YAG is in particulate form dispersed in a resin or polymer matrix wherein the YAG particle size is smaller than the wavelength of light in the YAG material, the resulting composite film will behave as though it has a homogeneous index of refraction the value of which will be a weighted average of the index for YAG and the index for the matrix material. For typical resins or polymers the index of refraction is in the range of 1.3 to 1.4, so to maximize the index of refraction for the composite film it is desirable to maximize the volumetric fraction of YAG in the film. Since the absorption of blue light by the film and photoluminescent emission are also dependent on the volumetric fraction of YAG material and on the thickness of the film as well as on the cerium doping concentration, these parameters need to be optimized together to achieve the desired results.

The extraction of blue light and longer wavelength light generated by the photoluminescent layer from the light source to provide useful light is dependent on the properties of the optical interface between the photoluminescent layer and the ambient environment in which the light source is used. The out-coupling of light to the external environment can be accomplished by many means known in the art such as providing a top layer with a graded index of refraction or providing a roughened surface with a texture designed for maximum light out-coupling. In some cases the ambient environment may be air and in other cases it may be the end of an optical fiber bundle or a "light pipe" comprising an optical waveguide to deliver the generated light to a location where it is desired.

It is also desirable to maximize the reflection of light from the lower surface of the photoluminescent layer to increase the useable extracted light by means known in the art.

The above disclosure generally describes the present invention. A more complete understanding can be obtained by reference to the following specific Examples. These Examples are described solely for purposes of illustration and are not intended to limit the scope of the invention. Changes in form and substitution of equivalents are contemplated as circumstances may suggest or render expedient. Although specific terms have been employed herein, such terms are intended in a descriptive sense and not for purposes of limitation.

EXAMPLES

Example 1

Figure 2:
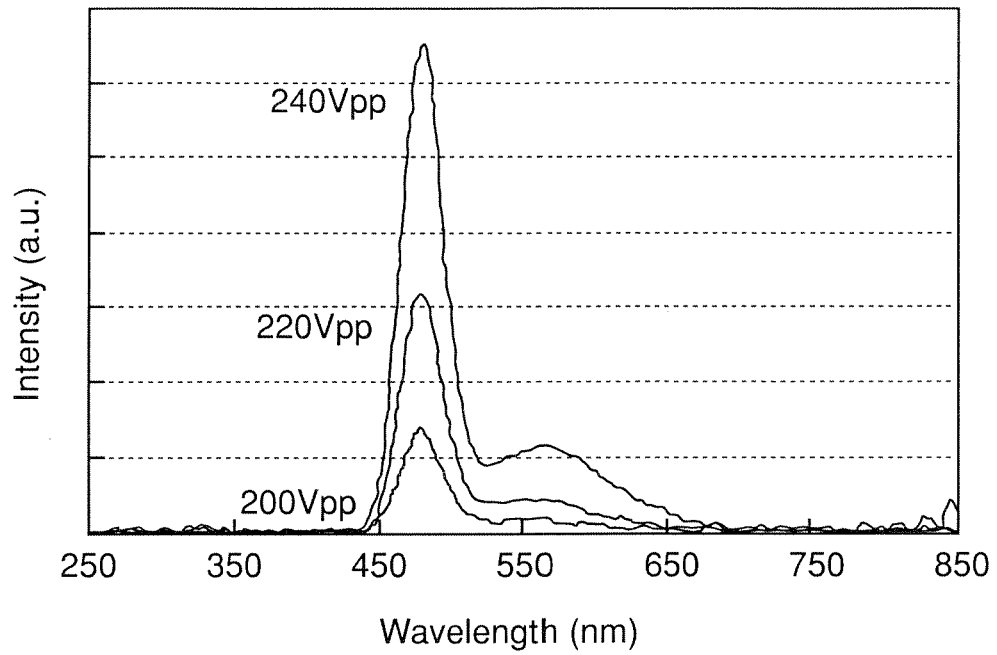
FIG. 2 is a graph of the optical emission spectrum of a white light emission device fabricated according to an embodiment of the invention.
Figure 3:
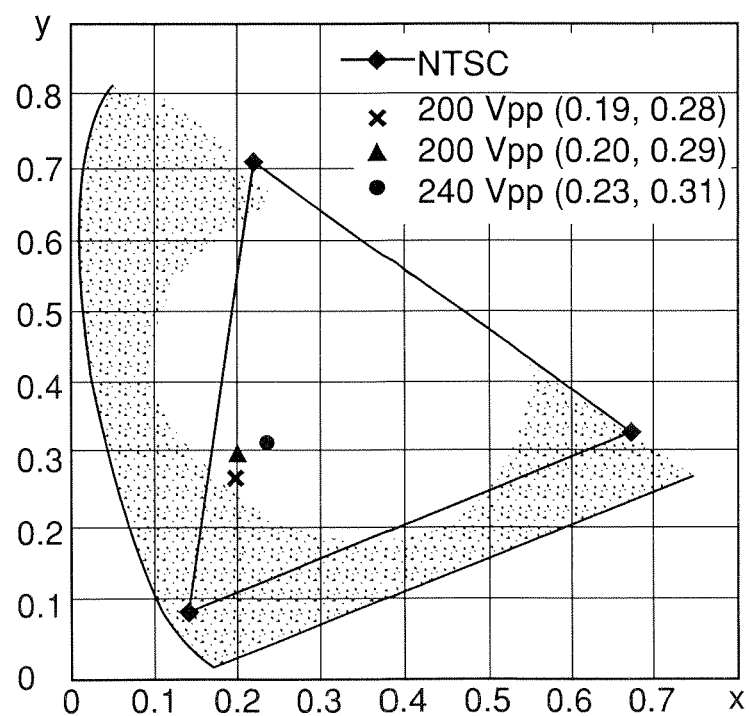
FIG. 3 is a diagram showing the CIE colour coordinates for a white light emission device of the present invention.
Figure 4:
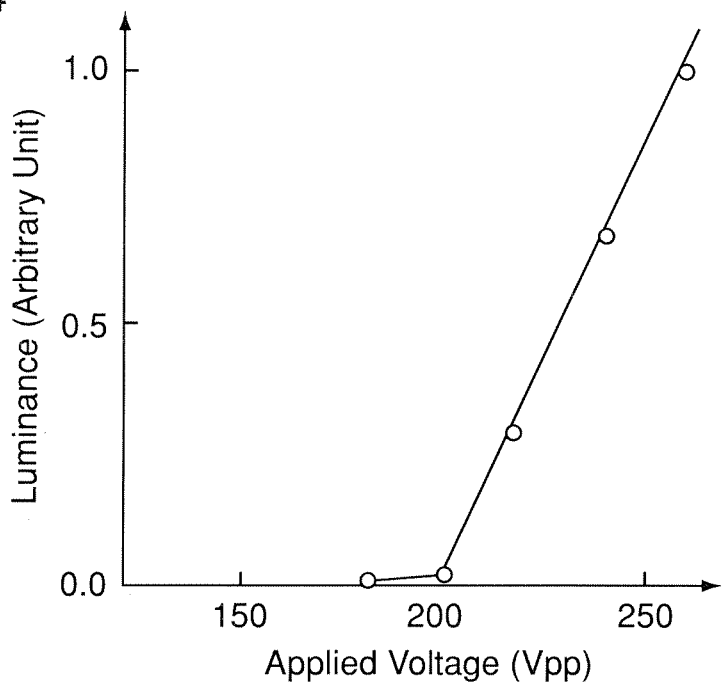
FIG. 4 is a graph showing the relative luminance of a white light emission device of the invention as a function of applied voltage.

A blue-emitting electroluminescent device having a europium activated barium thioaluminate phosphor film was fabricated on a 5 centimeter (length)×5 centimeter (width)×1 millimeter (thick) glass substrate fabricated using the methods as described in constructed according to the teachings of U.S. Pat. Nos. 5,432,015; 6,589,674; 6,919,126 and 7,112,373; and U.S. Patent Application Serial Nos. 2005/0202157; 2004/0170864; 2004/0170865; 2005/0202162; 2005/0255708 and 2006/0017381 (the disclosures of which are all incorporated herein in their entirety by reference). The 0.5 micrometer thick phosphor film was processed so that the barium thioaluminate had a face centered orthorhombic crystal structure as taught in U.S. Patent Application Serial No. 2006/0027788 (the disclosure of which is hereby incorporated by reference in its entirety). A photoluminescent layer was deposited on a second piece of glass and the coated glass was placed over the electroluminescent device with the photoluminescent layer facing towards the electroluminescent device. The completed device was sealed using a perimeter seal between the two pieces of glass. The device was operated using an alternating current voltage source to deliver a sinusoidal voltage waveform to the pixel. The peak voltage amplitude was varied in increments of 10 volts up to 270 volts. With the voltage at 240 volts, the frequency was varied between 60 Hz (120 light pulses per second) and 1.5 kHz. (3000 light pulses per second) FIG. 2 shows the optical emission spectrum for the device measured at 200, 220 and 240 volts. From the graph it can be seen that the shape of the emission spectrum remained nearly constant but that the intensity varied by about a factor of five. FIG. 3 shows the CIE colour coordinates for the emission at these voltages. The coordinates lie in a narrow range along a curve for white emitters having different colour temperatures. FIG. 4 shows the relative luminance as a function of driving voltage.

Figure 5:
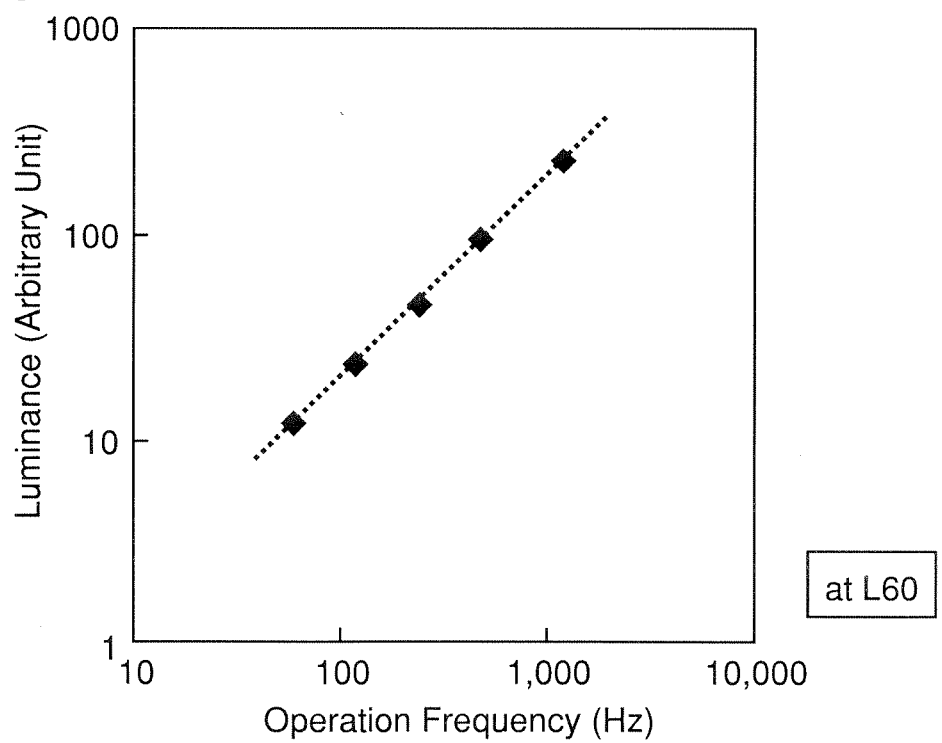
FIG. 5 is a graph showing the relative luminance of a white light emission device of the invention as a function of driving frequency.

The data shows that the luminance variation with voltage follows that for the blue emitter and provides a voltage range where the luminance changes nearly linear with voltage, providing for a high degree of luminance control through variation of the driving pulse amplitude. FIG. 5 shows the luminance variation with driving frequency, again showing a linear dependence of the luminance with frequency over nearly two decades of frequency variation. The data combined with absolute measurements of luminance on similar blue light-emitting TDEL devices of up to 1000 candelas per square meter at 260 volts and 120 Hz shows that the combined use of voltage and frequency control provides an extremely wide dynamic range for the luminance from a single device, ranging from less than 1 candela per square meter up to about 10,000 candelas per square meter at 260 volts and 1500 Hz. Since the driving pulse width needs only be about 50 microseconds it may be possible to drive similar devices at up to 10,000 Hz. There is no sign in the data of any departure from the linear dependence of luminance on frequency at 1500 Hz and so it may be possible to achieve a luminance as high as 50,000 candelas per square meter at higher driving frequencies.

TABLE ONE

| Phosphors | Excitation wavelength (nm) | Emission color |
|---|---|---|
| $La_2O_2S:Eu^{3+\,3)}$ | 380, 405 | Red |
| $Li(Eu,Sm)W_2O_8^{\,4)}$ | 405 | Red |
| $(Ba,Sr,Ca)_3MgSi_2O_8:Eu^{2+},Mn^{2+\,5)}$ | 380, 405 | Red |
| $Ba_2Si_5N_8:Eu^{2+\,6)}$ | 460, 405 | Red |
| $CaAlSiN_3:Eu^{2+\,7)}$ | 460, 405 | Red |
| $Ca_{(m/2)-x}Si_{12-(m+n)}Al_{m+n}O_nN_{16-n}:Eu^{2+}_x{}^{8)}$ ($\alpha$-SiAlON:Eu$^{2+}$) | 460 | Orange-Yellow |
| 例: m = 2n = 1.96, x = 0.07 | | |
| $(Y,Gd)_3(Al,Ga)_5O_{12}:Ce^{3+\,9)}$ | 460 | Yellow |
| $(Ba,Sr,Ca)_2SiO_4:Eu^{2+\,10,11)}$ | 460 | Green to |
| $Ca_3Sc_2Si_3O_{12}:Ce^{3+\,12)}$ | 460 | Green |
| $BaMgAl_{10}O_{17}:Eu^{2+},Mn^{2+\,13)}$ | 380, 405 | Green |
| $(Sr,Ca)_{10}(PO_4)_6Cl_2:Eu^{2+\,13)}$ | 380 | Blue |
| $AgRE_{0.95}Eu_{0.05}(WO_4)_{2-x}(MoO_4)_x{}^{15,16)}$ RE = Gd,La, x = 0-2 | 460, 390 | Red |
| $Ca_{10-x}(PO_4)_6S_{1+2/x}:Eu^{2+}_x{}^{17)}$ | 470 | Red |
| $Ca_2ZnSi_2O_7:Eu^{2+\,18)}$ | 460 | Orange to Red |
| $Ca_3Si_2O_7:Eu^{2+\,19)}$ | 460, 405 | Orange |
| $Li_2SrSiO_4:Eu^{2+\,19,20)}$ | 460, 405 | Yellow |
| $(Sr_{1-x}M_x)_3SiO_5:Eu^{2+}$ (M = Ca,Ba)$^{21)}$ | 460, 405 | Yellow to Orange |
| $BaSi_2O_2N_2:Eu^{2+\,22)}$ | 460, 405 | Blue Green |
| $SrSi_2O_{2-\delta}N_{2+2/3\delta}:Eu^{2+}$ ($\delta \approx 1$)$^{22)}$ | 370-460 | Green Yellow |
| $CaSi_2O_{2-\delta}N_{2+2/3\delta}:Eu^{2+}$ ($\delta \approx 0$)$^{22)}$ | 370-460 | Yellow |
| $Ca_{(m/2)-x}Si_{12-(m+n)}Al_{m+n}O_nN_{16-n}:Yb^{2+}_x{}^{23)}$ ($\alpha$-SiAlON:Yb$^{2+}$) | 460 | Green |
| 例: m = 2n = 2.0, x = 0.005 | | |
| $Si_{3-m}Al_mN_{4-n}O_n:Eu^{2+\,24)}$ ($\beta$-SiAlON:Eu$^{2+}$) | 300-460 | Green |

TABLE ONE-continued

| Phosphors | Excitation wavelength (nm) | Emission color |
|---|---|---|
| 例, m = 0.0872, n = 0.185, x = 0.209 $LaAl(Si_{6-z}Al_z)N_{10-z}O_z:Ce^{3+25)}$ | 380付近 | Blue |

The invention claimed is:

1. A light emitting device, said device comprising a thick film composite dielectric layer, a blue light-emitting phosphor layer, an inorganic photoluminescent film coated over the blue light-emitting phosphor layer, wherein said photoluminescent film permits transmission of only a portion of the blue light to convert to a light of a longer wavelength to provide a light having a defined colour, and wherein said device has a spatially extended surface over which the luminosity of the emitted light at the emission surface is uniform.

2. The device of claim 1, wherein the photoluminescent film has an index of refraction equal to or greater than that of the blue light-emitting phosphor layer.

3. The device of claim 1, wherein said light of a longer wavelength is white light.

4. The device of claim 1, wherein said blue light-emitting phosphor layer comprises an europium activated barium thioaluminate.

5. The device of claim 4, wherein said barium thioaluminate is $BaAl_2S_4$ II.

6. The device of claim 1, wherein said photoluminescent film comprises inorganic photoluminescent particles embedded in a polymer matrix.

7. The device of claim 6, wherein said particles have a particle size distribution in the range of about 3 to about 7 μm.

8. The device of claim 7, wherein said particles are present in said polymer matrix in an amount of about 20% to about 40% by weight of said matrix.

9. The device of claim 6, wherein the photoluminescent film comprises a garnet structure material.

10. The device of claim 9, wherein said garnet structure material is a yttrium aluminum garnet (YAG).

11. The device of claim 10, wherein said yttrium aluminum garnet (YAG) is cerium doped.

12. The device of claim 11, wherein said yttrium aluminum garnet is $Y_3Al_5O_{12}:Ce$.

13. The device of claim 6, wherein said photoluminescent film comprises a cerium or europium doped material selected from the group consisting of alkaline earth aluminates, rare earth aluminates, alkaline earth silicates, alkaline earth aluminosilicates, alkaline earth phosphates, alkaline earth silicon nitrides, silicon oxynitrides and combinations thereof.

14. The device of claim 6, wherein said polymer matrix is selected from epoxy and silicone.

15. The device of claim 6, wherein the thickness of the photoluminescent film is about 0.5 to about 1 millimeters.

16. The device of claim 1, wherein the spatially extended surface is a planar surface.

17. The device of claim 1, wherein the spatially extended surface is a curved surface.

18. The device of claim 1, wherein the spatially extended surface is a concave surface for concentrating the intensity of emitted light in a region above the surface.

19. The device of claim 1, wherein said display further comprises a substrate that is planar or curved.

20. The device of claim 1, wherein said thick film dielectric composite structure comprises a layer of a sintered perovskite piezoelectric or ferroelectric material selected from lead magnesium niobate (PMN) and lead magnesium titanate-zirconate (PMN-PT) and a thinner smoothing overlayer of a compatible piezoelectric or ferroelectric material of zirconate titanate (PZT).

21. A uniform light emitting device comprising, a thick film composite dielectric layer, a barium thioaluminate ($BaAl_2S_4$)phosphor layer over said thick film composite, and a yttrium aluminum garnet (YAG) coated over said phosphor layer, wherein said YAG permits transmission of only a portion of the blue light to convert to a light of a longer wavelength to provide a white light having a defined colour temperature, and wherein said device has a spatially extended surface over which the luminosity of the emitted light at the emission surface is uniform.

22. The device of claim 21, wherein said yttrium aluminum garnet is $Y_3Al_5O_{12}:Ce$.

23. The device of claim 22, wherein the thickness of said YAG is about 0.5 to about 1 millimeters.

24. The device of claim 22, wherein said YAG is provided as particles having a particle size distribution in the range of about 3 to about 7 μm.

25. The device of claim 24, wherein said resin particles are present in said polymer matrix in an amount of about 20% to about 40% by weight of said matrix.

26. The device of claim 1, wherein said emitted light is used in applications selected from backlights for electronic information displays, sensors and chemical assay devices.

27. The device of claim 1, wherein said emitted light is used in applications requiring a light source and general indoor or night-time outdoor lighting.

28. A method of making a uniform white light source, said method comprising;
to a thick film composite dielectric layer applying a blue light-emitting phosphor layer;
coating said blue light-emitting phosphor layer with a semi-transparent inorganic photoluminescent film; and
applying an electric field such that said photoluminescent film permits transmission of only a portion of the blue light to convert to a light of a longer wavelength to provide a light having a defined colour, and wherein said device has a spatially extended surface over which the luminosity of the emitted light at the emission surface is uniform.

* * * * *